United States Patent [19]

Henshaw et al.

[11] Patent Number: 5,302,820

[45] Date of Patent: Apr. 12, 1994

[54] OPTO-ELECTRONIC SCALE READING APPARATUS HAVING AN ARRAY OF ELONGATE PHOTO-SENSITIVE ELEMENTS AND A PERIODIC LIGHT PATTERN

[75] Inventors: James R. Henshaw, Stroud; Peter G. Holden, Cirencester; Colin K. Howley, Stonehouse, all of United Kingdom

[73] Assignee: Renishaw Transducer Systems Limited, Wotton-Under-Edge, United Kingdom

[21] Appl. No.: 72,693

[22] Filed: Jun. 7, 1993

Related U.S. Application Data

[63] Continuation of Ser. No. 970,175, Nov. 2, 1992, abandoned.

[30] Foreign Application Priority Data

Nov. 6, 1991 [GB] United Kingdom ............... 9123567
Mar. 27, 1992 [GB] United Kingdom ............... 9206750
Apr. 24, 1992 [GB] United Kingdom ............... 9208898

[51] Int. Cl.⁵ .............................................. G01D 5/34
[52] U.S. Cl. ........................ 250/231.16; 250/237 G; 356/375
[58] Field of Search .......... 250/237 G, 231.16, 208.1; 356/356, 359, 363, 375, 401

[56] References Cited

U.S. PATENT DOCUMENTS 4,782,229 11/1988 Ernst .
5,155,355 10/1992 Kabaya ........................... 250/231.16
5,184,014 2/1993 Stephens et al. ............... 250/237 G

FOREIGN PATENT DOCUMENTS 84306491.6 9/1984 European Pat. Off. .
0431976 6/1991 European Pat. Off. .
61-178612 8/1986 Japan .
63-274563 11/1988 Japan .
1231029 5/1971 United Kingdom .
1504691 3/1978 United Kingdom .

*Primary Examiner*—David C. Nelms
*Assistant Examiner*—Que T. Le
*Attorney, Agent, or Firm*—Spencer, Frank & Schneider

[57] ABSTRACT

Opto-electronic linear encoding apparatus includes a scale and a readhead movable relative to the scale in a direction of spacing of the scale lines. The readhead is formed of a single semi-conductor substrate, typically made of gallium arsenide. The substrate is divided into two regions, the first region including a light emitting diode having a plurality of elongate electrodes provided on its upper surface and spaced in the direction of spacing of the scale lines. The light emitting diode region, the elongate electrodes and the substrate cooperate to produce a plurality of coplanar elongate light emitting regions between the elongate electrodes which perform the combined functions of a diffused light source and an index grating. The second region is an analyzer having a plurality of elongate photosensitive elements spaced apart in the direction of spacing of the scale lines. The photosensitive elements are divided into a plurality of sets and are interleaved on the substrate in a repeating pattern with the outputs of elements of a given set being connected in common. The analyzer thus performs the combined functions of an analyzer grating and a plurality of photodetectors which generate a plurality of phase-shifted cyclically varying signals.

15 Claims, 4 Drawing Sheets

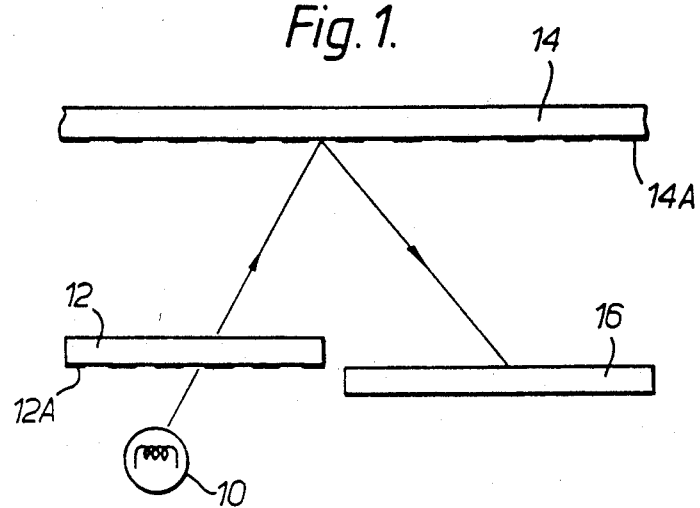
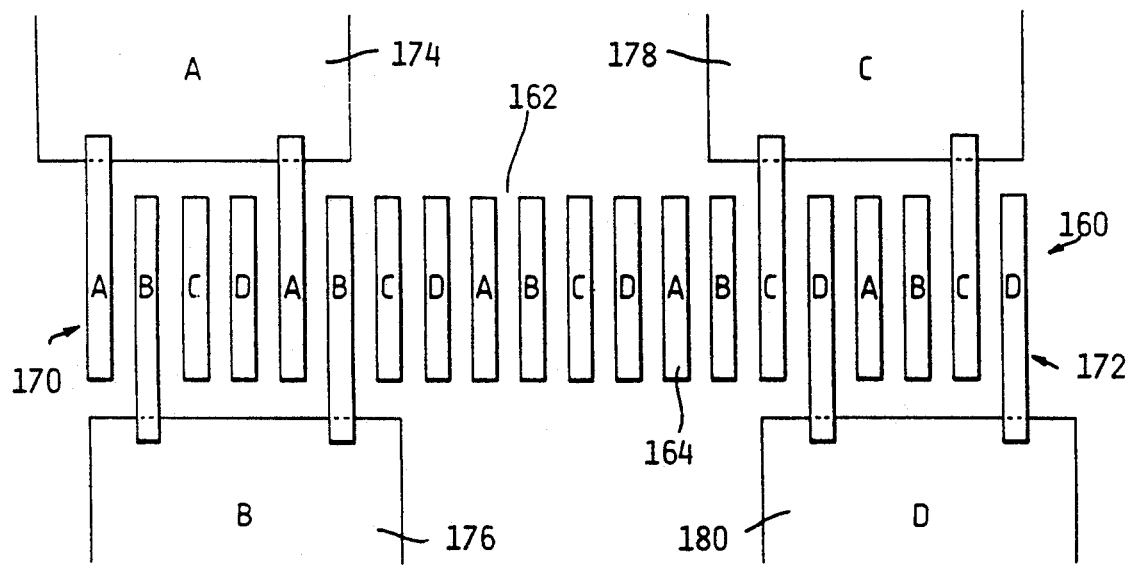

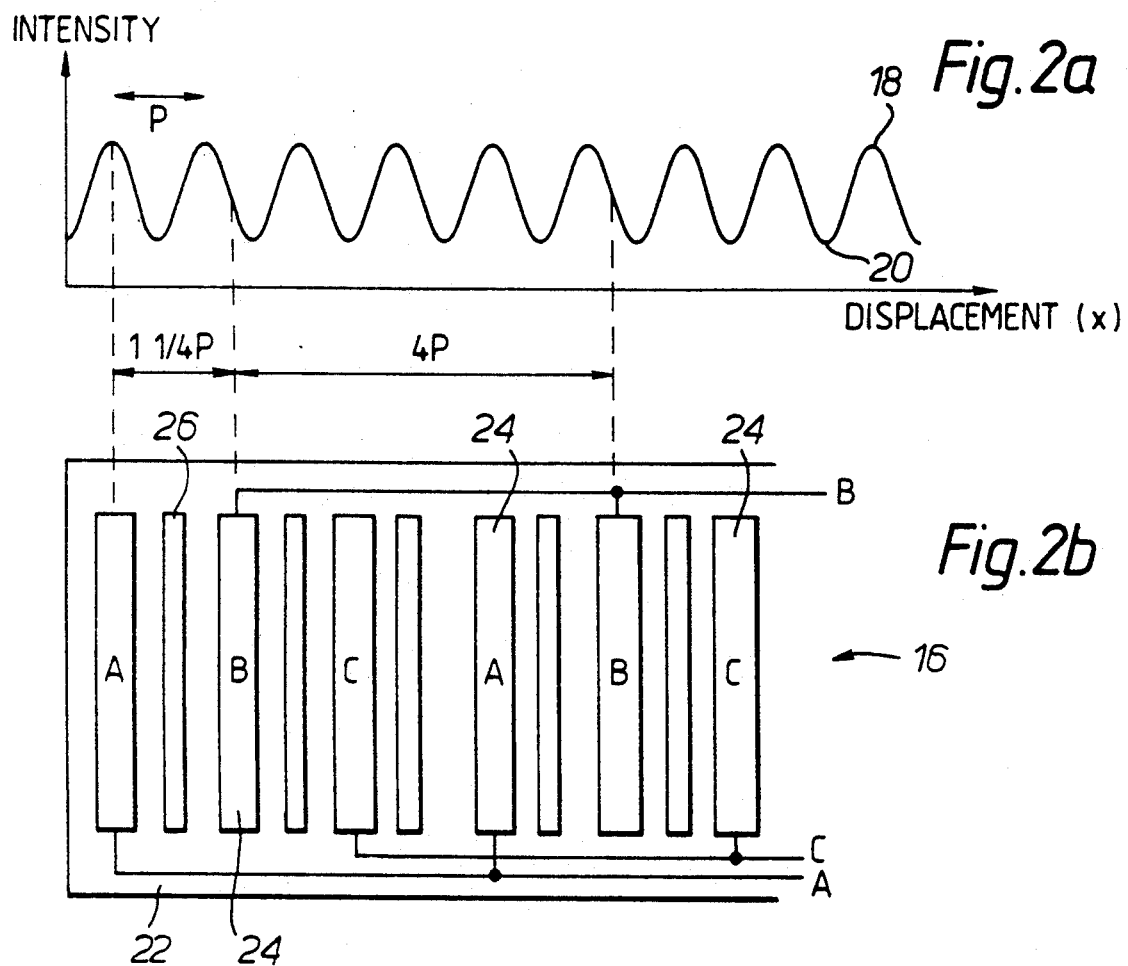
*Fig.2a*
*Fig.2b*
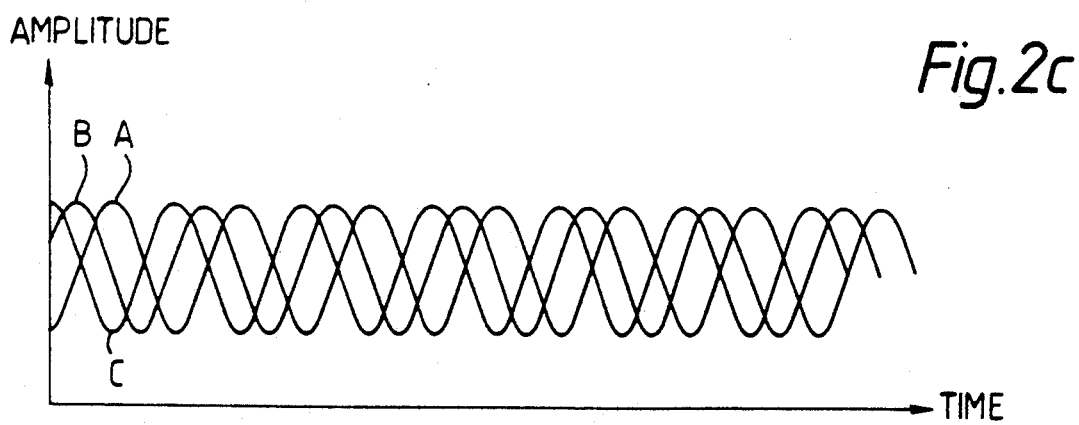
*Fig.2c*

Fig. 3.
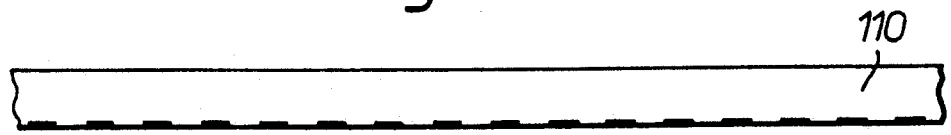
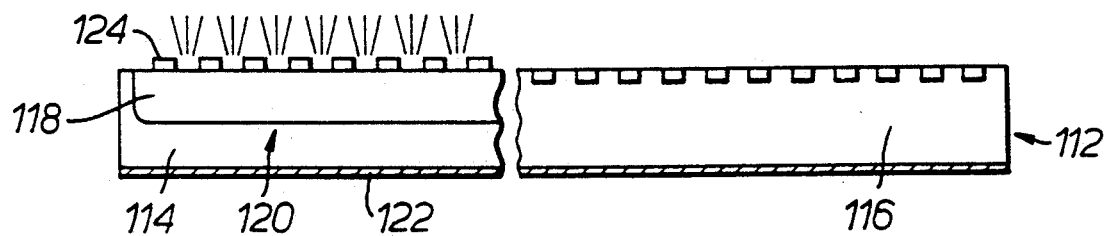
Fig. 4.
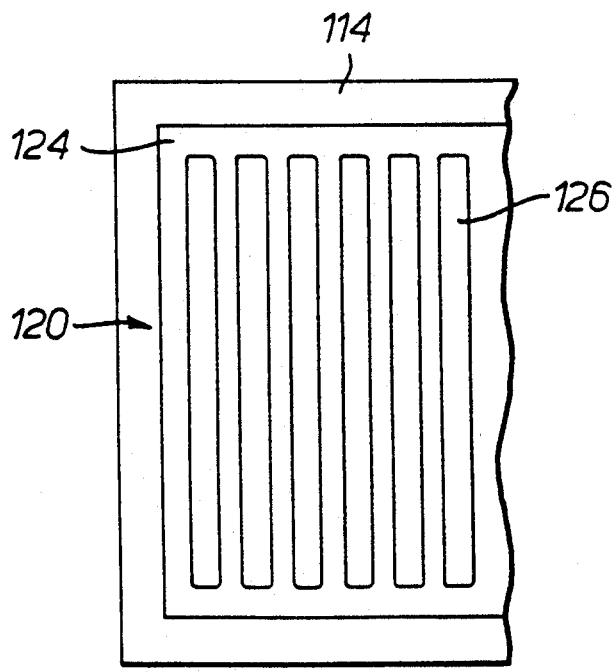

OPTO-ELECTRONIC SCALE READING APPARATUS HAVING AN ARRAY OF ELONGATE PHOTO-SENSITIVE ELEMENTS AND A PERIODIC LIGHT PATTERN

This application is a continuation of application Ser. No. 07/970,175, filed Nov. 2nd 1992, now abandoned.

BACKGROUND OF THE INVENTION

1. Field of the Invention

The present invention relates to an opto-electronic scale reading apparatus used, for example, to determine the magnitude and direction of movement of one member relative to another. Such an apparatus is typically used on coordinate positioning machines such as machine tools or coordinate measuring machines.

2. Description of Related Art

It is known from GB Patent No. 1,504,691 to provide a reflective scale which is scanned by a readhead having an index grating and an analyser grating. The readhead illuminates the scale via the index grating, and a periodic light pattern in the form of interference fringes is formed at the analyser grating as a result. Upon relative movement of the scale and the readhead the fringes move across the analyser grating creating, at a given point on the analyser, a light intensity modulation. In one embodiment of the said apparatus, the analyser grating may be positioned so that its lines extend fractionally obliquely to the interference fringes; this results in the generation of moire fringes. Four photo-detectors behind the analyser grating are offset with respect to a single moire fringe so that four phase-shifted cyclically varying electrical signals are produced, from which the magnitude and direction of said relative movement may be determined.

GB 1,231,029, proposes, in substitution of the analyser grating, a detector array comprising a plurality of photosensitive elements which combine the functions of the analyser grating and the photo-detectors. In order to provide phase-shifted detection signals, two or more of such detector arrays are required.

Both the above constructions suffer from a disadvantage. If, due to contamination of the scale or the readhead with dirt, the intensity of light incident upon one of the detectors or detector arrays differs significantly from that incident upon the other detectors or detector arrays, the phase-shifted signals produced will be significantly modified. This phenomenon is known as selective contamination, and affects the accuracy of the measurement.

SUMMARY OF THE INVENTION

The present invention provides opto-electronic scale reading apparatus comprising a scale defined by a series of spaced apart lines, and a readhead, moveable relative to the scale in the direction of spacing of the lines, for generating an output signal from which the magnitude and direction of relative movement of the scale and the readhead may be determined, the readhead comprising:

means for illuminating the scale and generating, in an image plane, a periodic light pattern which varies cyclically in intensity in the direction of spacing of the scale lines, said light pattern having a pitch defined by the separation of adjacent high intensity peaks a corresponding cyclic variation in light intensity at a given point on said plane resulting from relative movement of said scale and said readhead;

an analyser, positioned in said plane, comprising an array of elongate elements having a photo-sensitive surface, said elements being spaced apart in the direction of spacing of the scale lines and in a direction perpendicular to their length, said elements being grouped in a plurality of sets with elements of a given set being connected in common, all said elements being interleaved with elements of a different set in a repeating pattern; wherein:

all elements in a given set are spaced apart by a distance equal to an integer multiple of the pitch of the light pattern.

Because the elements of all of the sets are interleaved each set has elements distributed evenly across the array. The output signal generated by each set of elements is thus derived from light incident upon all areas of the array. Contamination of the apparatus affecting a particular area of the analyser array will therefore affect the output signals of all the sets of elements equally to within the limit of the size of an individual element. The present invention thus provides vastly improved immunity to selective contamination.

In a prior art apparatus of the type disclosed in GB 1,504,691, a single grating is used to perform the functions of both an index grating and an analyser grating. This has the associated advantage that the index and analyser gratings are automatically co-planar.

However, an apparatus which generates a periodic light pattern in an image plane by the optical mechanism disclosed in GB 1,504,691, and which employs a photosensitive analyser array to perform the combined functions of an analyser grating and photodetectors requires a separate index grating. In such an apparatus, a difficulty exists in positioning both the index grating and analyser array in a position in which they are coplanar.

A second independent aspect of the present invention provides opto-electronic scale reading apparatus comprising a scale defined by a series of spaced apart lines, and a readhead, moveable relative to the scale in the direction of spacing of the lines, for generating an output signal from which the magnitude and direction of relative movement of the scale and the readhead may be determined, the readhead comprising:

means for illuminating the scale and generating, in an image plane, a periodic light pattern which varies cyclically in intensity in the direction of spacing of the scale lines, a corresponding cyclic variation in light intensity at a given point on said plane resulting from relative movement of said scale and said readhead;

an analyser, positioned in said plane, comprising an array of elongate elements having a photo-sensitive surface, said elements being spaced apart in the direction of spacing of the scale lines and in a direction perpendicular to their length, said elements being grouped in a plurality of sets with elements of a given set being connected in common, all said elements being interleaved with elements of a different set in a repeating pattern; wherein:

said illuminating means comprises a plurality of coplanar light emitting regions provided on a substrate, said regions being spaced apart in the direction of spacing of said scale lines and in a direction perpendicular to the direction of their length, and said photo-sensitive array and said light emitting regions are provided on the same substrate.

This aspect also has ancillary advantages of reduced cost and well matched emitter/detector radiation response characteristics.

Usually, the outputs of the sets of photo-sensitive elements are combined in accordance with a suitable combination scheme to generate a pair of sinusoidally varying outputs having a 90° phase relationship (known as quadrature signals). These quadrature signals are used to interpolate the magnitude and direction of the relative movement of the scale and readhead. In order to interpolate accurately, the quadrature signals should, ideally, have identical amplitudes. In prior art apparatus the amplitudes of the quadrature signals may be adjusted by electronic amplification of, for example, the output signals of each of the detectors. It would however, be preferable to avoid the need for electronic signal adjustment, since this would allow simplification of the design of the electronic circuitry.

A third independent aspect of the present invention provides opto-electronic scale reading apparatus comprising a scale defined by a series of spaced apart lines, and a readhead, moveable relative to the scale in the direction of spacing of the lines, for generating an output signal from which the magnitude and direction of relative movement of the scale and the readhead may be determined, the readhead comprising:

means for illuminating the scale and generating, in an image plane, a periodic light pattern which varies cyclically in intensity in the direction of spacing of the scale lines, a corresponding cyclic variation in light intensity at a given point on said plane resulting from relative movement of said scale and said readhead;

an analyser, positioned in said plane, comprising an array of elongate elements having a photo-sensitive surface, said elements being spaced apart in the direction, of spacing of the scale lines and in a direction substantially perpendicular to their length, said elements being grouped in a plurality of sets with elements of a given set being connected in common, all said elements being interleaved with elements of a different set in a repeating pattern; wherein:

a shutter is provided, movable between a first position and a second position at which the shutter obscures part of the surface of the array; and only the photo-sensitive surfaces of elements of one of said sets lie on said part of the array obscured by the shutter when it occupies the second position.

It is also desirable to adjust the relative phase of the outputs from the sets of elements. Preferably therefore, said elements whose surfaces lie on the part of the array obscured by the shutter will be configured such that movement of the shutter causes a variation in the position of the center of area of the exposed parts of their surface in the direction of periodicity of the light pattern.

BRIEF DESCRIPTION OF THE DRAWINGS

Embodiments of the invention will now be described, by way of example, and with reference to the accompanying drawings in which:

FIG. 1 is a representation of an opto-electronic scale reading apparatus according to the present invention;

FIGS. 2a-c illustrate a first embodiment of the present invention;

FIG. 3 is a section through a second embodiment of the present invention;

FIG. 4 is a plan view of a part of the apparatus of FIG. 3;

FIG. 5 is a third embodiment of the present invention;

DESCRIPTION OF PREFERRED EMBODIMENTS

Figure 6:
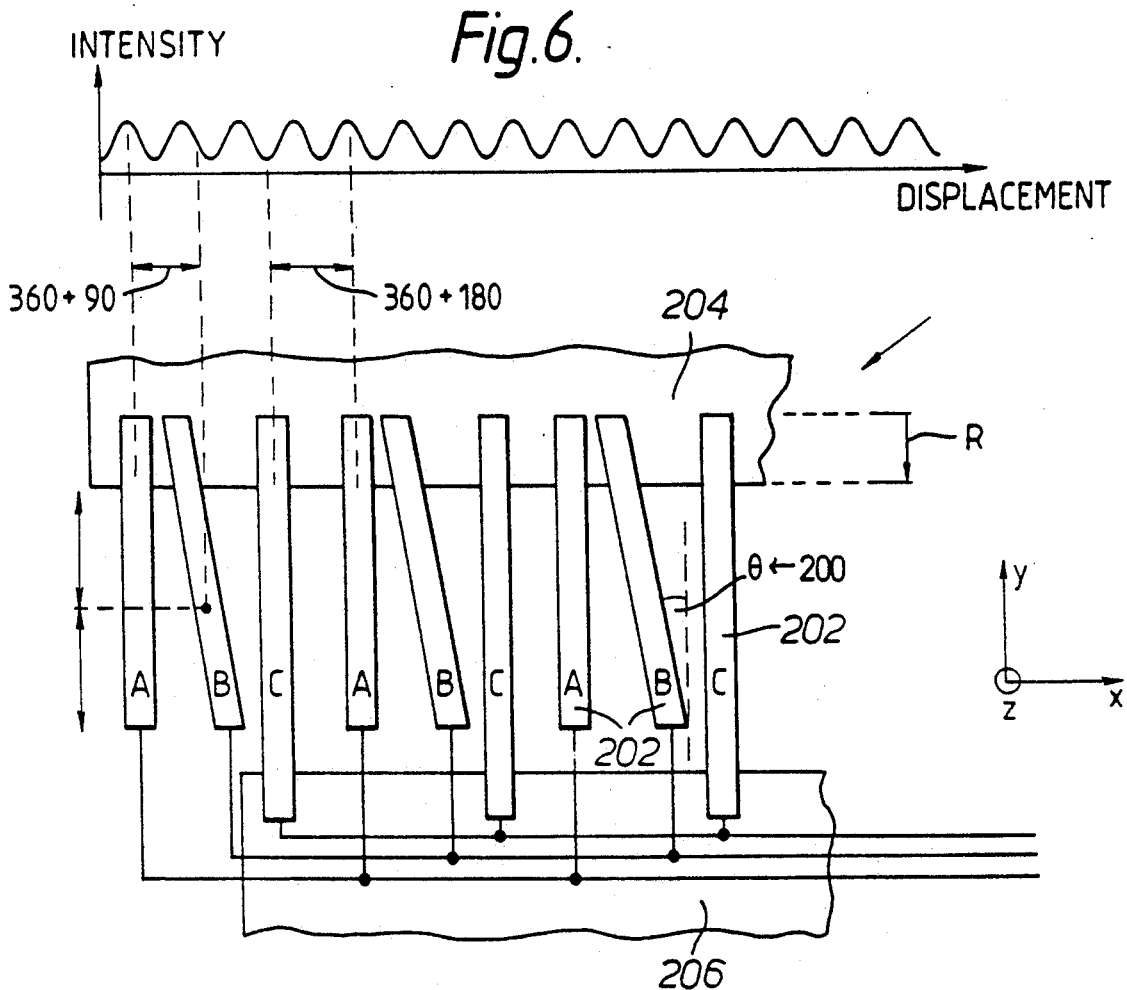
FIG. 6 is a fourth embodiment of the present invention.

Referring now to FIG. 1, a light source 10, index grating 12, and scale 14 cooperate to generate a periodic light pattern at an image plane occupied by an analyser 16. The light source 10, index grating 12 and analyser 16 are embodied in a single unit known as a readhead, which is movable relative to the scale 14 in a direction x, which is the direction of spacing of the lines 12A,14A defining the index grating 12 and scale 14 respectively. The magnitude and direction of relative movement between the readhead and the scale 14 is determined by detecting movement of the periodic light pattern across the surface of the analyser 16. The exact configuration of the readhead, or the optical mechanism by which the periodic light pattern is generated at the analyser 16 is not important in this example. Thus, the mechanism disclosed in EP 207121 may be used to generate the periodic light pattern; alternatively, the mechanism shown in GB 1,504,691 may be used. In each case however, the pitch of the light pattern generated is equal to, or less than (e.g. ½ the pitch) the pitch of the scale lines. Typically, the pitch of the scale lines will be between 20 and 40 microns.

The light intensity distribution in the image plane is illustrated in a graph in FIG. 2a, and has a substantially sinusoidal shape characterized by peaks 18, corresponding to positions upon the analyser at which a high intensity of light is incident, and troughs 20, corresponding to positions on the analyser at which a low intensity of light is incident. The period, or pitch of the periodic light pattern is denoted in FIG. 2 as the distance P.

FIG. 2b illustrates the analyser 16 (to the same scale as the graph). The analyser 16 comprises a semi-conductor substrate 22 having, on its surface, an array of elongate photo-sensitive elements 24 spaced-apart in the x direction. Each of the elements 24 is electrically insulated from an adjacent element, by an insulating guard diode 26. The elements 24 are divided into three sets A,B,C and are positioned across the array in an interleaved repeating pattern A,B,C, A,B,C . . . ; the elements of each set are electrically connected. The spacing of elements 24 of the set A from elements 24 of the set B, and the spacing of elements 24 of the set B from elements 24 of the set C is equal to 1¼ pitches P of the periodic light pattern; the spacing of elements 24 of the set C from elements 24 of the set A is equal to 1½ pitches P of the periodic light pattern. Elements 24 of a given set are therefore spaced from adjacent elements 24 of that set by 4 pitches P of the periodic light pattern (i.e. 1¼+1¼+1½).

As the readhead moves relative to the scale 14 in the direction x the periodic light pattern moves across the surface of the analyser 16. Because all elements 24 of a given set are spaced from each other by an integer multiple of the pitch P of the periodic light pattern, the same intensity of light will be incident upon all the elements 24 of the given set at any given moment in time. Further, the spacing of 1¼ pitches P between elements 24 of the sets A and B, and elements 24 of the sets B and C corresponds to a phase shift of 360°+90°. Therefore, as the light pattern moves across the surface of the analyser 16 the electrical outputs of the sets A and B, and B and C will vary cyclically, and have a phase shift of 90°, as illustrated in FIG. 2c. The three outputs of the sets A,B,C may be combined to generate quadrature signals which may then be used to interpolate the magnitude and direction of relative movement of the readhead and the scale. A method of combining the three outputs 24A,B,C to generate such quadrature signals is disclosed in our earlier published patent application WO87/07944.

In an alternative spacing of elements 24 each element 24 is spaced from an adjacent element 24 by 1⅓ pitches P. The outputs of the sets A,B,C will, in this embodiment be phase-shifted by 120°.

An analyser array of the above-mentioned type is advantageous over the prior art devices for a number of reasons. The principal advantage however is the insensitivity of the apparatus to selective contamination of individual photo-detectors. In a prior art 3-phase apparatus comprising three individual photo-detectors whose outputs modulate at the same frequency and by the same amplitude but are phase-shifted to enable the generation of a quadrature signal, contamination of a particular area of the scale or of an individual photo-detector would disrupt the balance between the three outputs and cause the generation of an imperfect quadrature signal (which would in turn result in inaccuracies in the distance values deduced therefrom). In the present invention, the photosensitive elements 24 are distributed evenly over the entire photo-sensitive area of the analyser 16. Contamination of any given area of the analyser will thus affect each set of elements A,B,C to approximately the same extent, as will any contamination of a given area of the scale.

As mentioned above, any suitable optical mechanism and configuration of readhead may be used to generate the periodic light pattern. However, the use of an analyser array with a readhead of the type described in GB 1,504,691 has an associated difficulty in that it is difficult to place the index grating and analyser array in coplanar positions. Referring to FIGS. 3 and 4, a construction of readhead is illustrated which overcomes this difficulty. A scale 110 is read by a readhead 112 provided by an array 114 of photo-emitting elements, and an analyser array 116 (which will not be described further). The photo-emitting array 114 effectively combines the functions of a light source and an index grating. The photo-emitting array 114 and analyser 116 are provided on the same semiconductor substrate, which is typically of gallium arsenide or some other suitable III/V semiconductor material.

The photo-emitting array 114 comprises an area 118 which is a light emitting diode (LED) 120. One of the electrodes for the LED is provided by the common ground electrode 122 at the rear of the substrate. The other electrode for the LED 120 is a metallisation layer 124 on the front of the substrate. The metallisation layer 124 has the form of a grid pattern which defines elongate apertures 126. In an LED, most of the light emitted originates from areas of the semiconductor material which lie adjacent the electrode. Thus, the regions of the LED 120 which lie in register with the apertures 126 will emit light in a manner very similar to the passage of light through an index grating. This embodiment of the invention provides automatic coplanarity of the photo-emitting array 114 and analyser array 116, while reducing the expense of the apparatus by obviating the need for one or more optical gratings and detectors. This embodiment of the present invention may be particularly useful in an analogue, or scanning probe used, e.g. on a coordinate measuring machine, such as a probe described in WO90/04149.

As mentioned above, the outputs of the sets A,B,C are combined in a number of possible ways to generate quadrature signals. It may be necessary to adjust the amplitude of the individual outputs A,B,C. In the prior art apparatus this is achieved by electrically amplifying or reducing the amplitude of the outputs from individual photodetectors. This is undesirable since additional electronics are required. To overcome this problem, a third embodiment of the present invention enables the optical equalisation of the output amplitudes of the signals from individual sets of photo-sensitive elements. Referring now to FIG. 5, an analyser 160 has a silicon substrate 162 having, on its surface, a plurality of spaced apart photo-sensitive elements 164 each separated from an adjacent element 164 by an insulating guard diode (not shown). In this embodiment, the elements 64 are divided into 4 sets A,B,C,D and the elements 64 are interleaved in a repeating pattern A,B,C,D, A,B,C,D . . . ; elements of a given set are connected in common. The array 160 may, for the purposes of illustration, be divided into two portions 170,172. Portion 170 of the array includes light sensitive elements 164 wherein the elements 164 of the sets A and B are longitudinally extended in a direction perpendicular to the direction of spacing of the elements, with the elements of set A being extended in the opposite direction to the elements of the set B. The elements 164 of sets A and B in portion 170 of the array are thus approximately 10–15% longer than the elements 164 of the sets C and D. Shutters 174,176 are each movable between a first position, and a second position at which part of the array is obscured; specifically, the part of the array on which the extended parts of the elements 164 of the sets A and B lie. By adjusting the position of shutters 174,176 to selectively shutter light from the surface of elements of the sets A and B it is possible to adjust the magnitude of the signal output therefrom. The number of the elements 64 of the sets A and B which are extended longitudinally and the magnitude of the extension depends upon the required range of adjustment of signal strength. Thus, where only a small range of signal strength adjustment is required only some of the elements in the sets A,B need be extended. Portion 172 includes, as with portion 170, four sets of elements A,B,C,D interleaved in a repeating pattern, and with elements of a given set being connected in common (both with each other and with the elements of the corresponding set in portion 170 of the array). In portion 172 of the array 160 elements of the sets C,D are extended longitudinally and shutters 178,180 respectively are provided to enable adjustment of the signal strength output from the sets of elements C,D.

Using the method of selective shuttering described above, it is thus possible to regulate the amplitude of signal output from one or more sets of sensitive elements 64.

As mentioned above, it is desirable to simplify the electronic circuitry used to process the output signals from the various sets of elements. Thus, in addition to providing "optical" adjustment of the amplitude of the outputs from the various sets of signals, the present invention also provides optical adjustment of the relative phase.

Referring now to FIG. 6, an analyser array 200 comprises a series of elongate photo-sensitive elements 202 extending substantially in the Y direction, and spaced apart in the X direction. The elements 202 are divided into three sets A,B,C and are interleaved on the array in a repeating pattern; the outputs of elements of a given set are connected in common. As can be seen in FIG. 6, the elements 202 of the sets A and C extend substantially parallel both to each other and to the Y direction. However, the elements of the set B extend at a small angle $\theta$ to the Y direction. A phase-shutter 204 is provided over the upper ends of the elements 202 and masks part of the elements 202 from the periodic light pattern. The spacing of the elements 202 and the angle at which the elements of set B are slanted relative to the elements of sets A and C is such that when the displacement of the shutter 204 is at the reference displacement R, the center of area of the exposed portion of the elements 202 of the sets A and B are separated by the same distance in the X direction as the center of area of the exposed portions of the elements 202 of the sets B and C. The spacing of the elements 202 relative to the pitch P of the periodic light pattern is such that, at the reference displacement R of the shutter 204, the center of area of the elements 202 of the sets A and B, and the elements 202 of the sets B and C are spaced from each other by a distance equal to $1\frac{1}{4}$ pitches P of the periodic light pattern, corresponding to a phaseshift of $360° + 90°$. The spacing between the elements 202 of the sets C and A is equal to $1\frac{1}{2}$ pitches P, and thus corresponds to a phase-shift of $360° + 180°$.

Figure 7:
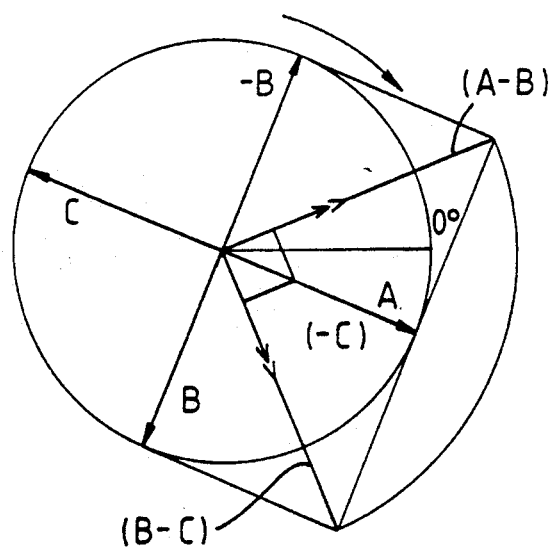
FIG. 7 is a signal diagram.

When the periodic light pattern moves across the surface of the analyser 200 the outputs of the three sets of elements A,B,C will vary cyclically. These cyclically varying outputs are illustrated in the rotating vector diagram of FIG. 7, in which each of the outputs A,B,C is represented by an arrow whose angular displacement corresponds to the phase of the output, and whose length corresponds to its magnitude (i.e. amplitude). From the diagram it can be seen that the output of the elements 202 of the set A leads the output of the elements 202 of the set B by 90°; similarly the output of the elements 202 of the set B leads the output of the elements 202 of the set C by 90°. (N.B. In general, in order that the outputs of the elements 202 may vary cyclically upon relative movement of the scale and readhead, the width over which each element extends in the X direction should be a maximum of half the pitch of the light pattern.)

The outputs of the sets A,B,C may be combined according to the combination scheme (A-B), (B-C) to generate two signals having a quadrature relationship. This is only true however provided that the magnitude (i.e. amplitude) of the outputs area equal, and that the phase-shift between the outputs is exactly 90°. Should either the magnitude, or the phase of any one set of elements vary relative to the magnitude or phase of any of the other sets of elements then the resultant signals (A-B), (B-C) will not have a quadrature relationship; errors in the measurement of the position of the readhead relative to the scale will result. Amplitude adjustment is provided, as with the previous embodiment, by longitudinally extending elements 102 of the set C (for example), and providing a shutter 206 to adjust the exposed area of these elements.

The relative phase of the outputs of elements of the set B is adjusted by movement of the shutter 204 in the Y direction. This has no appreciable effect on the relative amplitude of the output signals from the sets A,B,C, since the phase shutter masks substantially equal amounts of each of the elements 202 of all the sets. However, because the elements 202 of the set B extend at a small angle $\theta$ relative to the Y direction, the position of the center of area of each of these elements in the X direction shifts in accordance with the displacement of the phase shutter 204. Thus if the phase shutter 204 is retracted from the reference position R, the center of area of each of of elements 202 of the set B will shift toward elements 202, of the set A and the phase angle between the output of the elements of set B and the outputs of the elements of set A will decrease. Conversely if the phase shutter 204 is projected from the reference position R then the center of area of each of the of elements of set B will move toward the elements of the set C and the phase angle between the output of these two sets of elements will decrease. Typically, the angle $\theta$ is a small angle of the order of 1°.

In an alternative embodiment providing phase shift, the elements of one set are shaped so that one end is asymmetrically tapered, thus providing a lateral shift of the center of areas of each of these elements when a phase shutter is displaced appropriately.

We claim:

1. Opto-electronic scale reading apparatus comprising a scale defined by a series of spaced apart lines, and a readhead, moveable relative to the scale in the direction of spacing of the lines, for generating an output signal from which the magnitude and direction of relative movement of the scale and the readhead may be determined, the readhead comprising:

means for illuminating the scale and generating, in an image plane, a periodic light pattern which varies cyclically in intensity in the direction of spacing of the scale lines, a corresponding cyclic variation in light intensity at a given point in said plane resulting from relative movement of said scale and said readhead;

an analyser, positioned in said plane, comprising an array of elongate elements having a photo-sensitive surface, said elements being spaced apart in the direction of spacing of the scale lines and in a direction perpendicular to their length, said elements being grouped in a plurality of sets with elements of a given set being connected in common, all said elements being interleaved with elements of a different set in a repeating pattern; wherein:

said illuminating means comprises a plurality of elongate coplanar light emitting regions provided on a substrate, said regions being spaced apart in the direction of spacing of said scale lines and in a direction perpendicular to the direction of their length, and said photo-sensitive array and said light emitting regions are provided on the same substrate.

2. Apparatus according to claim 1 wherein said substrate is of a semiconductor material.

3. Apparatus according to claim 2 wherein said substrate is of gallium arsenide.

4. Apparatus according to claim 2 wherein said light emitting regions are provided by a region of said semiconductor material forming a light-emitting diode, and a plurality of elongate spaced apart electrodes provided on said region.

5. Apparatus according to claim 4, wherein the said electrodes are provided in the form of a grid.

6. Apparatus according to claim 1 wherein all photo-sensitive elements in a given set are spaced apart by a distance equal to an integer multiple of the pitch of the light pattern.

7. Apparatus according to claim 1, wherein a shutter is provided, movable between a first position and a second position at which the shutter obscures part of the surface of the array; and only the photo-sensitive surfaces of elements of one of said sets lie on said part of the array obscured by the shutter when it occupies the second position.

8. Opto-electronic scale reading apparatus comprising a scale defined by a series of spaced apart lines, and a readhead, moveable relative to the scale in the direction of spacing of the lines, for generating an output signal from which the magnitude and direction of relative movement of the scale and the readhead may be determined, the readhead comprising:

means for illuminating the scale and generating, in an image plane, a periodic light pattern which varies cyclically in intensity in the direction of spacing of the scale lines, said light pattern having a pitch defined by the separation of adjacent high intensity peaks; a corresponding cyclic variation in light intensity at a given point on said plane resulting from relative movement of said scale and said readhead;

an analyzer positioned in said plane, comprising an array of elongate elements having a photo-sensitive surface, said elements being spaced apart in the direction of spacing of the scale lines and in a direction perpendicular to their length, said elements being grouped in a plurality of sets with elements of a given set being connected in common, all said elements being interleaved with elements of a different set in a repeating pattern; wherein:

all elements in a given set are spaced apart by a distance equal to an integer multiple of the pitch of the light pattern.

9. Opto-electronic scale reading apparatus according to claim 8 wherein said integer is greater than unity.

10. Opto-electronic scale reading apparatus according to claim 9 wherein elements of said given set are spaced apart by a distance equal to four pitches of said periodic light pattern.

11. Opto-electronic scale reading apparatus according to claim 10 wherein each set of elements generates a cyclically varying output signal, and the output signals of at least two of said sets has a phase separate of one of 90° and 120°.

12. Opto-electronic scale reading apparatus according to claim 9 wherein adjacent photosensitive elements are separated by guard diodes.

13. Opto-electronic scale reading apparatus comprising a scale defined by a series of spaced apart lines, and a readhead, movable relative to the scale in the direction of spacing of the lines, for generating an output signal from which the magnitude and direction of relative movement of the scale and the readhead may be determined, the readhead comprising:

means for illuminating the scale and generating, in an image plane, a periodic light pattern which varies cyclically in intensity in the direction of spacing of the scale lines, a corresponding cyclic variation in light intensity at a given point on said plane resulting from relative movement of said scale and said readhead;

an analyzer, positioned in said plane, comprising an array of elongate elements having a photo-sensitive surface, said elements being spaced apart in the direction of spacing of the scale lines and in a direction substantially perpendicular to their length, said elements being grouped in a plurality of sets with elements of a given set being connected in common, all said elements being interleaved with elements of a different set in a repeating pattern; wherein:

a shutter is provided, movable between a first position and a second position at which the shutter obscures part of the surface of the array; and at least one of said sets of elements are configured such that movement of the shutter causes a variation in the position of the center of the area of the exposed parts of their surface in the direction of periodicity of the light pattern.

14. Opto-electronic scale reading apparatus according to claim 13 wherein the photosensitive elements of said at least one set extend obliquely with respect to the photosensitive elements of all the other sets.

15. Opto-electronic scale reading apparatus comprising a scale defined by a series of spaced apart lines, and a readhead, movable relative to the scale in the direction of spacing of the lines, for generating an output signal from which the magnitude and direction of relative movement of the scale and the readhead may be determined, the readhead comprising:

means for illuminating the scale and generating, in an image plane, a periodic light pattern which varies cyclically in intensity in the direction of spacing of the scale lines, a corresponding cyclic variation in light intensity at a given point on said plane resulting from relative movement of said scale and said readhead;

an analyzer, positioned in said plane, comprising an array of elongate elements having a photo-sensitive surface, said elements being spaced apart in the direction of spacing of the scale lines and in a direction substantially perpendicular to their length, said elements being grouped in a plurality of sets with elements of a given set being connected in common, all said elements being interleaved with elements of a different set in a repeating pattern; wherein:

a shutter is provided, movable between a first position and a second position at which the shutter obscures part of the surface of the array; and only the photo-sensitive surface of elements of one of said sets lie on said part of the array obscured by the shutter when it occupies the second position.

* * * * *